July 26, 1932.  E. C. WILEY  1,868,555

REGULATING APPARATUS FOR STEAM HEATING SYSTEMS

Filed June 13, 1930   5 Sheets-Sheet 5

INVENTOR
Edgar C. Wiley
BY
Siggers & Adams
ATTORNEYS

Patented July 26, 1932

1,868,555

UNITED STATES PATENT OFFICE

EDGAR C. WILEY, OF LYNCHBURG, VIRGINIA, ASSIGNOR TO SIMPLEX HEATING SPECIALTY COMPANY, INC., OF LYNCHBURG, VIRGINIA, A CORPORATION OF VIRGINIA

REGULATING APPARATUS FOR STEAM HEATING SYSTEMS

Application filed June 13, 1930. Serial No. 460,952.

This invention relates to automatic regulating apparatus for steam heating plants, particularly those plants in which steam is fed to the individual radiator units through closely calibrated restricting orifices placed in the supply connection to each radiator for limiting the quantity of steam supplied at the lower pressures and to pass larger quantites as the pressure is increased up to a fixed maximum for the coldest weather. The general object is to provide a trouble-proof system which will act automatically responsive to changes in the temperature of the atmosphere and to other weather conditions affecting the temperature in a building, to regulate delivery of steam to the radiators by regulating the pressure of the steam within the supply piping system as may be required for varying weather conditions. It is a further object to provide a regulating system well adapted for use with the zoning system of heating large office buildings, which is now coming into use in most large cities of the United States.

Referring to the accompanying drawings forming a part of this specification and showing a preferred embodiment of the invention,—

Figure 1:
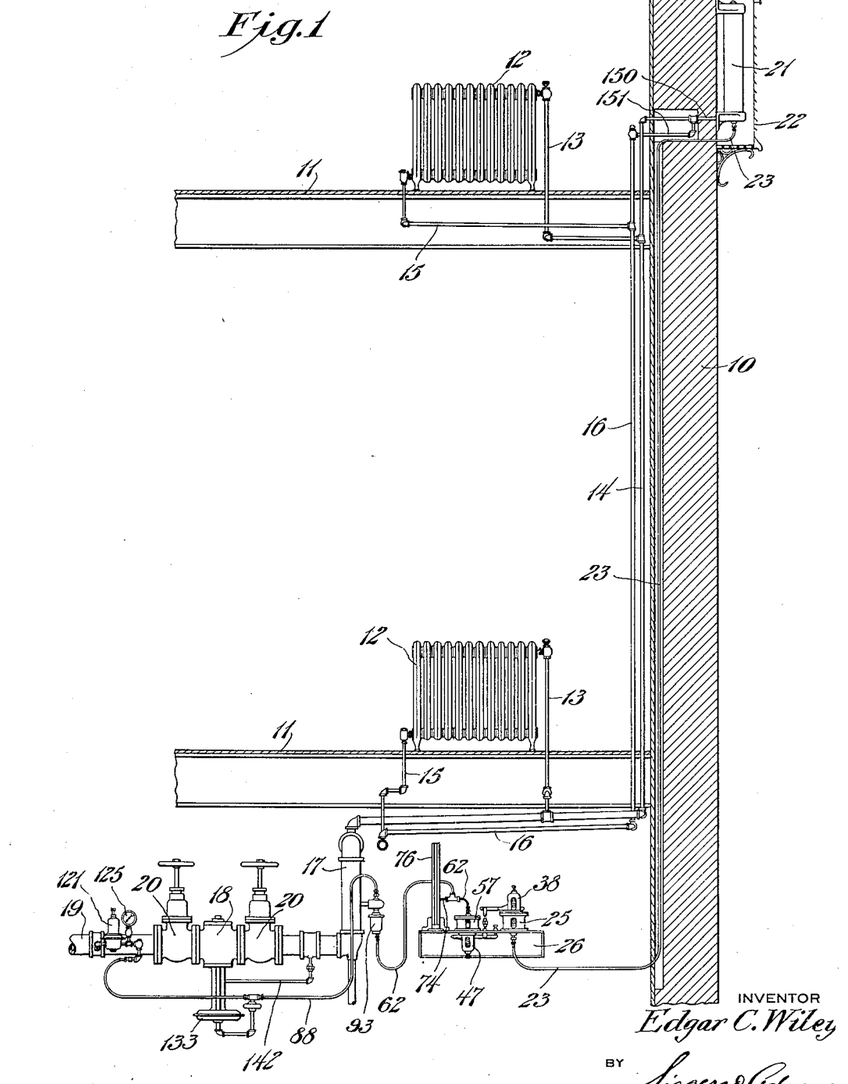
Fig. 1 is an elevation of the regulating apparatus shown with a part of a heating system for a building, and also showing in section a small part of a building.

Referring particularly to the drawings, and first to Fig. 1, there is shown the outside wall 10 of a building and two of its floors 11 with a radiator 12 shown on each floor. The radiators 12 are the radiating elements of a two-pipe steam heating system which has been selected for illustration. However, the invention may have other applications. The radiators 12 receive steam from the supply pipes 13 which are connected with the supply riser 14; and the radiator return pipes 15 for the condensate are connected with the drop riser 16. The live steam is supplied to the risers 14 from a low pressure supply main 17 which receives steam through the reducing valve 18 from a high pressure main 19 directly connected with the boiler (not shown). Gate valves 20 on either side of the reducing valve 18 permit the entire system to be shut off from the high pressure main.

The parts so far described are more or less standard and form no part of the present invention except as certain elements co-operate with other elements to be described to form patentable combinations, as hereinafter claimed.

According to the invention, means are provided for utilizing the outside temperature, that is, the temperature outside of the building, to provide a varying fluid pressure in a pipe to actuate certain regulating elements which govern the pressure within the supply pipes and consequent flow of steam to the radiators. As shown in Fig. 1, there is a tank 21 supported outside of the building but protected from the weather and from the direct rays of the sun by means of a ventilated housing 22 supported on the wall 10. The tank 21 is designed to contain oil or other non-freezing liquid and preferably should have a capacity of several gallons. While it is highly preferable, as a rule, to locate the tank 21 on the outside of a building, in some instances it may be inside, and it is within the scope of my invention to locate said tank wherever seems most desirable for the particular installation. Connected from the bottom of tank 21 is a tube 23 which may be carried down through the wall of the building to the basement, where the regulating apparatus is located. The tube 23 is connected to the interior of a corrugated copper bellows 24, as best shown in Fig. 2, said copper bellows being contained in a cylindrical housing 25 which is supported on a shelf 26.

The tank 21, tube 23 and bellows 24, when filled with oil, together provide means responsive to changes in the temperature of the atmosphere which may actuate regulating elements governing the flow of steam; but because of the fact that heat expands oil, while cold contracts it, it is necessary to provide means which upon expansion of oil will lower the pressure and thus restrict the flow of steam; and it is also necessary for satisfactory results to provide for an increase in pressure and to accelerate the feeding of steam in the presence of extremely cold weather.

Figure 2:
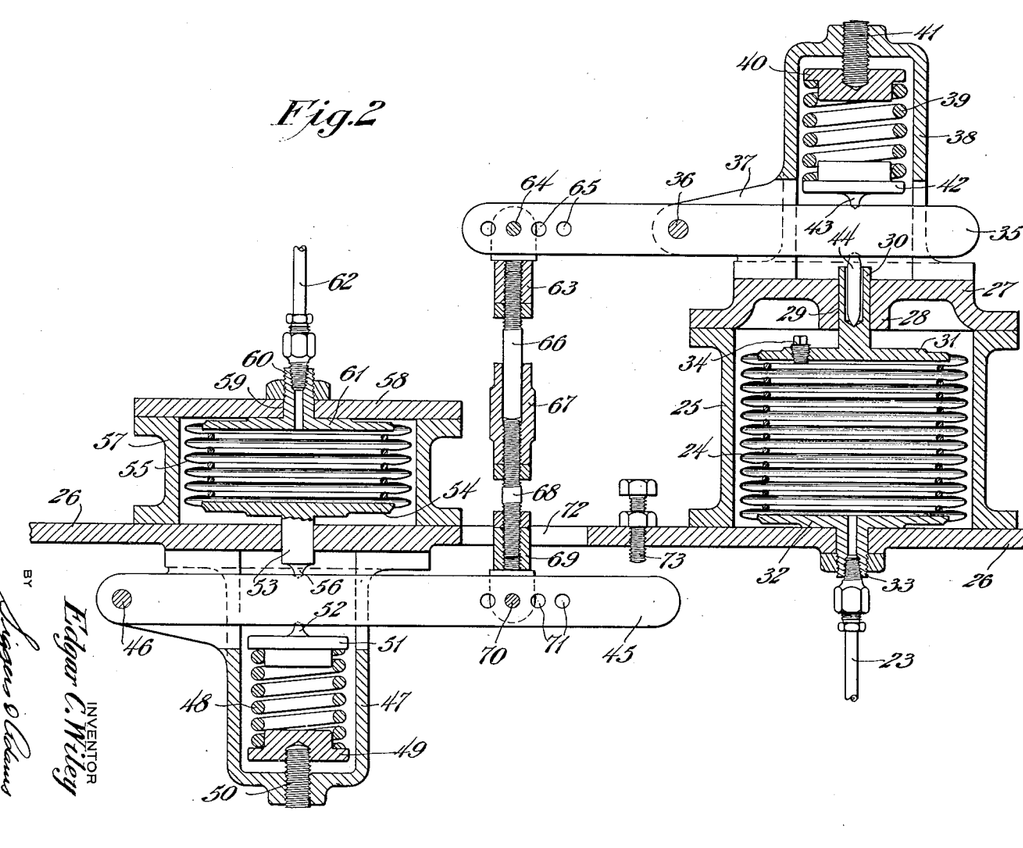
Fig. 2 is a vertical section on a large scale of part of the regulating apparatus shown in Fig. 1.

Referring to Fig. 2, it will be seen that the cylindrical housing 25 has a head 27 provided with a boss 28, the boss being perforated, as indicated at 29, so that a stem 30 on upper bellows head 31 may be slidable in said boss. At the lower end, the bellows 24 has a head 32, said head being provided with a stem 33 having a central orifice leading to the interior of the bellows as shown, said stem being made fast to the tube 23 and to the shelf 26, as shown. Thus the lower bellows head is fixed while the upper bellows head is movable as the volume of fluid within the bellows changes. A screw plug 34 is provided in the upper bellows head 31 so as to permit complete filling of the system including the tank 21, tube 23 and bellows 24 with a supply of oil or the like, the air being driven out by the pressure through the aperture which the plug 34 closes. From the foregoing it will be clear that when the oil in tank 21 expands, because of an increase in temperature, such expansion will be communicated to the bellows 24 and the head 31 will rise in the casing 25, thus moving the stem 30 upwardly.

Mounted above the casing 25 is a lever 35 pivoted intermediate its ends, as indicated at 36, the pivot preferably being a pin secured to a pair of arms 37 (only one of which is shown), said arms being integral with a casing 38 secured to or integral with a cylinder head 27. In the casing 38 is a coil spring 39 bearing against a disk 40 at its upper end, the position of the disk 40 being regulated by means of the adjusting screw 41, which obviously increases the tension of the spring 39 when screwed down. The coil spring 39 also bears against the spring follower 42, preferably in the form of a disk, as shown, and having a dog 43 which engages with a depression in the upper side of the lever 35. The spring 39 therefore tends to move lever 35 downwardly and thus may counterbalance the tendency of the static head of the oil in tube 23 to move the lever 35 upwardly. A dog 44 mounted in the stem 30 provides means to insure non-slipping engagement between said stem and the lever 35, said lever thus being balanced between the spring and the head 31 when the latter is subjected to a certain pressure.

It will be clear that if spring 39 is under the proper tension, it will exactly counteract the static head of the oil in tube 23, so that expansion or contraction of the oil in tank 21 will expand or contract the bellows 24 and move lever 35 against the pressure of spring 39, the result being a positive movement of lever 35 counter-clockwise as the outside temperature rises, and a clockwise movement as the outside temperature falls.

Pivotally mounted on the underside of the shelf 26 in any convenient way is a second lever 45 which is connected with the lever 35 by means to be described. The lever 45 is pivoted at one end, as indicated at 46, the pivot being provided on a casing 47 in which there is a coil spring 48, a disk 49, and a regulating screw 50 similar to the corresponding parts in casing 38. A spring follower 51, like the spring follower 42, has a dog 52 engaging with the underside of lever 45 so that the spring 48 tends to lift lever 45.

Directly engaging the lever 45 at a point above the dog 52 is a stem 53 which may reciprocate through a bore in the shelf 26, as shown, and which is secured to a movable bellows head 54 of the bellows 55. The stem 53 has a dog 56 for non-slipping engagement with the lever 45. A cylinder 57 provides a housing for bellows 55 and is closed at its upper end by a head 58, the lower end of the cylinder 57 being closed by the shelf 26. The head 58 has a perforation 59 receiving a stem 60 having a central orifice and projecting from the fixed bellows head 61. There is a tube 62 secured to stem 60 and connecting with the orifice thereof, so that the interior of said tube is open to the interior of the bellows 55. The tube 62 and bellows 55 are designed to contain a liquid, for example oil, which is under a static head and this head obviously will tend to move lever 45 downwardly in opposition to the tendency of spring 48 to swing said lever upwardly.

The preferred means for connecting the levers 35 and 45 will now be described. As shown in Fig. 2, there is a stirrup 63 having a pin connection 64 with one of a series of holes 65 in one end of lever 35, the stirrup 63 being screw-threaded to receive a threaded rod 66 whose lower end is slidably received in a thimble 67. The thimble 67 is internally threaded at its lower end and engages the screw-threaded upper end of a rod 68. The lower end of rod 68 is also screw-threaded and thus engages a stirrup 69, like stirrup 63, which is pivotally connected by a pin 70 to one of a series of perforations 71 provided in lever 45. The described lever-connecting means passes through an opening 72 in the shelf 26 and adjacent said opening a stop screw 73 is provided for engagement with the outer free end of lever 45, to limit upward movement thereof.

The means connecting levers 35 and 45 provide an adjustable link so constructed that lever 35 may press downwardly on lever 45 (to expand bellows 55) but cannot exert a tension or lifting effort. In other words, the free end of lever 35 is not attached to lever 45 when moving responsive to contraction of the oil in the temperature-responsive system, and hence lever 35 can continue its clockwise movement after lever 45 has come in contact with stop screw 73. However, the adjustable link does provide means whereby lever 35 can force 45 downwardly to lower the mercury column, hereinafter described, and reduce the pressure in tube 62 leading to the pilot valve to be described.

The parts shown in Fig. 2 constitute what may be called an adjustable "reversing relay" which is interposed between the temperature responsive system which terminates in the bellows 24 and the steam supply regulating means (to be described) which terminates in the bellows 55. The purpose of this "reversing relay" is to make it possible to employ the expansion of the fluid in the temperature-responsive system to restrict flow of steam, and the contraction of the same fluid to increase the steam flow. As the quantity of steam delivered through an orifice does not increase in direct proportion to the increase in pressure, it is necessary to provide for an acceleration in the rate of pressure increase on the ascending scale, so that the rate of increase of steam delivery will be in proper proportion to the lowering of the outside temperature. Therefore, I provide means cooperating with the "reversing relay" just described to effect an acceleration in the steam pressure scale through regulating elements, all as will be described hereinafter.

Referring to Fig. 1, it is seen that the tube 62 has a branch 74. The lower end of the branch 74 leads to a mercury pressure-controlling device, shown in Figs. 3, 4 and 5. The mercury pressure-controlling device consists of a reservoir 75, a standard 75ª, preferably integral with the reservoir and having a port 76 (Fig. 4), a glass pane 77 extending the length of the standard 75ª, a removable filler piece 78 secured to the standard 75ª and interposed between said standard and the glass pane 77, and two carefully arranged scales 79, 80, the scale 79 indicating outside temperatures and the scale 80 indicating by comparison with a corresponding height on the opposite scale, the pounds of steam pressure necessary to hold an even room temperature for all outside temperatures which the system is designed to take care of. The glass pane 77 is sealed in position so as to prevent the escape of mercury. The described device is best secured in an upright position upon the shelf 26, as shown in Fig. 1.

Figures 3, 4, 5:
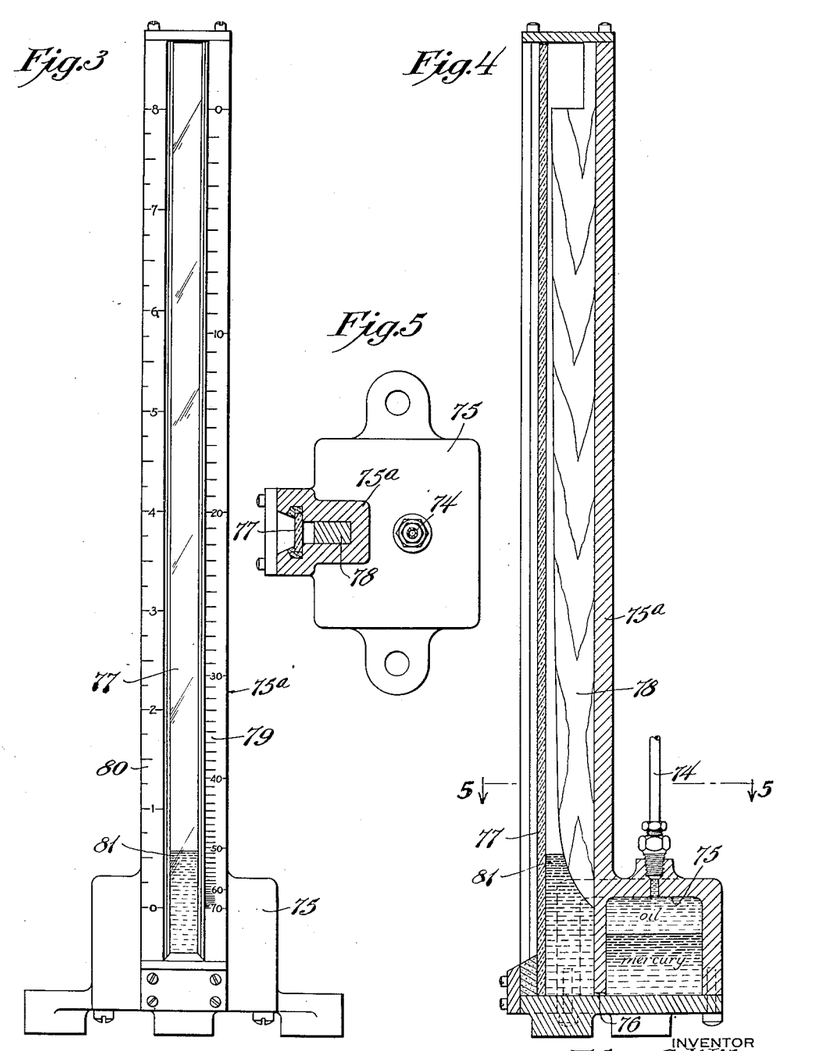
Fig. 3 is a front elevation of a mercury pressure-controlling device which forms part of the invention.
Fig. 4 is a longitudinal section through the device of Fig. 3.
Fig. 5 is a section on line 5—5 of Fig. 4.

It will be clear from Fig. 4 that the cross-section of the mercury column is not uniform, but decreases as the column rises. Nor is the decrease uniform. The rate of decrease per unit of height corresponds to the rate of increase in steam pressure (lbs. per sq. in.) required to deliver uniform quantities of steam through an orifice to a radiator in a heating system, throughout the outside temperature range. While the mercury is pushed out of the reservoir into the column at a uniform rate per degree of change of outside temperature, the rise in the column and the consequent pressure on the regulating fluid is increased at an accelerating rate corresponding to the pressure curve for delivery of uniformly increasing quantities of steam through an orifice.

Since the quantity of steam delivered does not increase in direct proportion to the increase in steam pressure, the temperature scale 79 (which is inverted) is not divided into regularly spaced sub-divisions, but begins with a maximum spacing at the top, the intervals between the sub-divisions decreasing at an accelerating rate as the bottom of the scale is approached. The rate of change in the spacing of the sub-divisions of scale 79 corresponds inversely to the steam delivery curve of an orifice through the corresponding pressure range.

Since the controlling fluid pressure of the regulating apparatus and the consequent equivalent pressure within the heating mains are to be fixed by the height of the mercury column 81, a comparatively small change in steam pressure is necessary when the outside temperature varies around 60° F. See in this connection the relative spacing of scales 79 and 80 at their lower ends. On the other hand, a large increase in steam pressure is necessary if the outside temperature drops a few degrees, when around 0° F.

Referring to Figs. 2 and 4, the bellows 55, pipe 62 and its branch 74 are all completely filled with oil and said oil is in contact with the surface of the mercury in reservoir 75. It will be clear that when the bellows 55 expands because of an expansion of the oil in tank 21 responsive to a rise in the outside temperature, some of the oil in the reservoir 75 moves up into the branch pipe 74 and the mercury level in the reservoir 75 is permitted to rise. Hence the mercury column 81 will descend, the mercury column being connected with the mercury in the reservoir through the port 76. As the bellows 55 will expand to receive more oil only when the lever 45 moves downwardly or clockwise corresponding to a counterclockwise movement of lever 35, and such movement of lever 35 is effected only by expansion of bellows 24 (which in turn takes place only upon expansion of the oil in tank 21), it follows that any expansion of the oil in the tank 21 due to a rising outside temperature will effect a fall in the height of the mercury column 81, while contraction of oil in tank 21 will effect a rise in said mercury column. Obviously by replacing removable filler piece 78 with another filler piece of different shape, the mercury column will be varied and hence the rate of its rise and fall may be changed, thus changing the rate of steam flow, as more fully described hereafter.

When the apparatus so far described is to be put in use, the bellows 24 and 55 and the tubes connected therewith are completely filled with oil, and the tension screw 50 (Fig. 2) is turned to bring the necessary tension on spring 48, which forces the free end of lever 45 up against the stop screw 73. This compresses bellows 55, forcing oil down on the mercury in reservoir 75 and forcing the mercury column 81 up to the desired maximum pressure limit. Then the fluid pressure in tube 62 (which leads to a pilot valve to be described) results from the force of spring 48 and not from the static head or expansion of fluid in tank 21 and tube 23. However, any increase in volume of fluid in tank 21 will, because of the "reversing relay" of Fig. 2, force lever 45 downwardly, expanding bellows 55 and causing a lowering of mercury column 81.

Figures 6, 7:
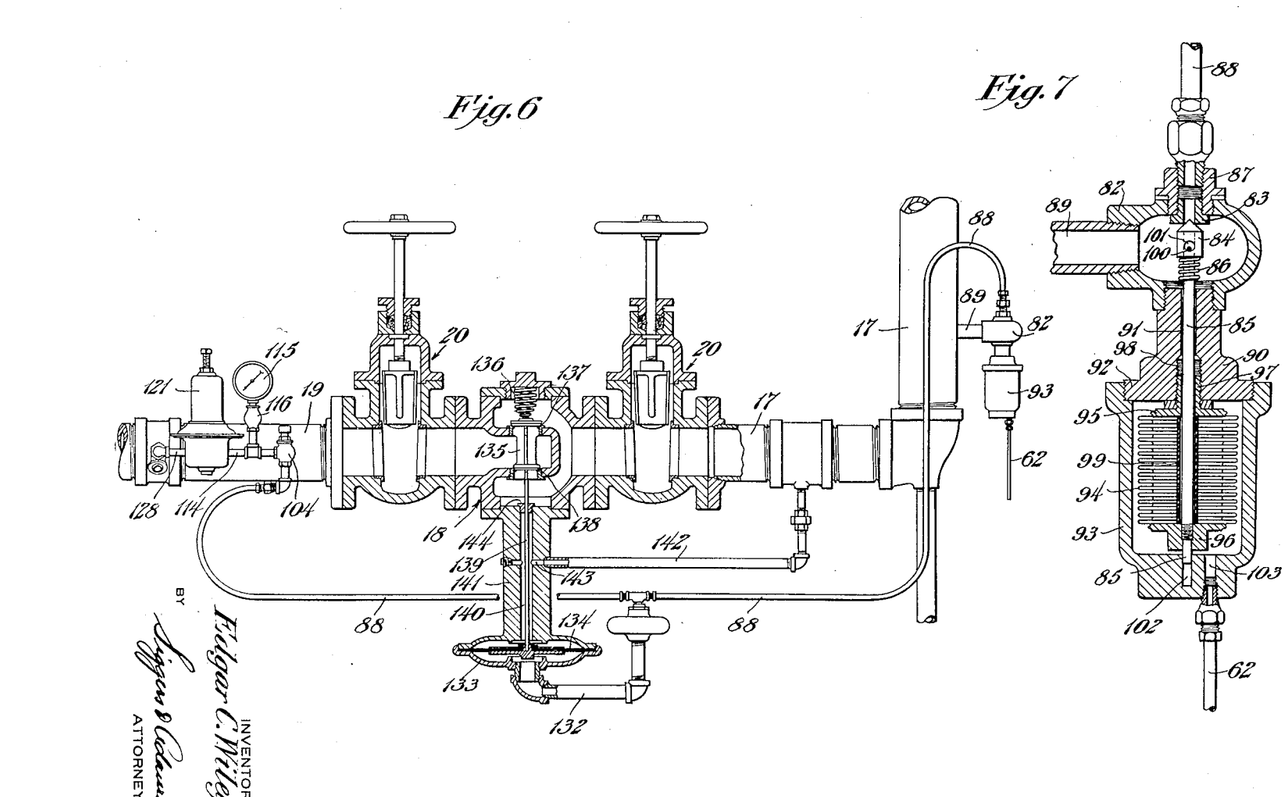
Fig. 6 is a vertical section of another part of the apparatus.
Fig. 7 is an enlarged vertical section through the pilot valve.

Referring to Figs. 6 and 7, there is shown a pilot regulating valve 82 which is employed to control the steam pressure and flow in the supply pipe responsive to changes in the height of the mercury column 81. The pilot valve 82 comprises a screw-threaded valve seat 83, a valve member 84 carried on a valve stem 85, and closing against seat 83, a valve spring 86 mounted on the valve stem 85 and abutting the valve 84, a union 87 screwed into the valve 82 and also internally threaded to receive the removable valve seat 83, and a pressure tube 88 connected by means of the union 87 to the pilot valve 82. The pressure tube 88, as shown in Fig. 6, is connected to the high pressure main 19 through a reducing valve to be described. Also secured to the pilot valve body is a short length of pipe 89 which opens to the interior of the low pressure main 17, as shown in Fig. 6. Thus the pressure within the pilot valve chamber is always the same as the pressure in the low pressure main 17.

Secured to the pilot valve body is a coupling member 90 having a central longitudinal orifice or bore 91 and a head 92 having threaded engagement with casing 93. Within the casing 93 is bellows 94, and the bellows is closed at the upper end by the stationary head 95 and at the lower end by the movable head 96. The upper head 95 is held stationary because it is provided with the screw-threaded nipple 97 engaging with a tapped counterbore 98 in the coupling member 90. The lower head 96 is free to move longitudinally of the casing 93 to a limited extent, said head engaging the screw-threaded portion of the valve stem 85, as clearly shown. The interior of the bellows 94 is in communication with the low pressure main 17 through the bore 91 and pilot valve chamber. Thus, as the bellows 94 expands, because of steam pressure, it will move the valve 84 off of the seat 83, and as said bellows contracts, it will force the valve 84 to its seat. Expansion and contraction of the bellows 94 with constant reciprocatory movement of the valve stem 85 take place upon rising or falling of the mercury column 81, which communicates with the interior of casing 93 by means of the oil in tube 62.

Surrounding the valve stem 85 and within the bellows is a spacing sleeve 99 whose function is to limit the upward movement of the valve stem to a point where the valve 84 makes a fair contact with the seat 83. The upper end of the valve stem carries a cross pin 100 which passes through a large lateral opening 101 in the valve member 84. The spring 86 bearing against the valve 84 normally tends to hold said valve in the position shown in Fig. 7; but when the valve is seated under some pressure, the tension of spring 86 will be overcome and the pin 100 may come out of contact with the bottom side of the opening 101. This insures proper contact of the valve with its seat. When the valve is seated, the bellows 94 cannot push the valve stem farther up on account of the sleeve 99; and if an excess pressure is built up in pressure tube 88 (as hereinafter explained) such excess pressure is relieved at the valve 84 by a compression of the coil spring 86 underneath said valve, thus acting as a safety valve to relieve such excess pressure and to protect against the possible rupture of diaphragm 134 to be described (see Fig. 6).

In order to guide the stem 85 in its reciprocation, and to prevent the bellows 94 from coming in contact with the inner walls of casing 93, the valve stem 85 is slidably received within a counterbore 102 (Fig. 7) at the lower end of casing 93. An opening 103 is also provided in the lower end of said casing so that the tube 62 is in communication with the interior of the casing 93. Thus there is a body of oil interposed between the bellows 94 and the mercury in reservoir 75 and the bellows 55.

Figure 8:
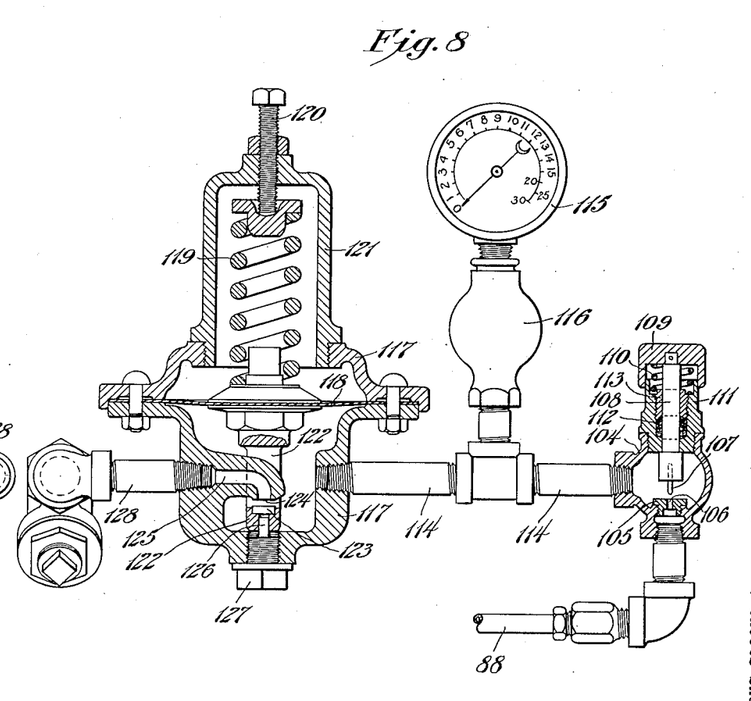
Fig. 8 is an enlarged vertical section through the pressure-regulating valve and associated parts.

Referring to Fig. 6, it is seen that the pressure tube 88 leads to a member 104 which may be called the leak port member, as it includes an orifice bushing 105 (Fig. 8) provided with a leak port 106 through which a small quantity of steam may pass. The leak port is of fine diameter and to make it possible to clean the port in case foreign matter should clog the port, a cleaning needle 107 is provided, said cleaning needle being carried by a stem 108 which is reciprocable, a knob 109 being secured to the stem 108 and a coil spring 110 surrounding said stem and normally maintaining the knob and stem in the uppermost position, as shown in Fig. 8. When desired, however, the knob 109 may be depressed, thus forcing the cleaning needle 107 down into the leak port, which will clear the port of any foreign material. The stem 108 passes through a combined stuffing box and stem guide 111 provided with a packing 112 and a packing gland 113. A pipe 114 supplies steam to the leak port, being connected through a reducing valve to be described with the high pressure main 19, as best shown in Fig. 6. Somewhere along the pipe 114, a pressure gage 115 is located and said gage is preferably protected by a water seal 116, of standard construction and hence unnecessary to describe or illustrate.

A reducing valve, best shown in Fig. 8, is employed to insure a substantially uniform pressure against the leak port. In ordinary practice, the pressure from the high pressure steam line 19 may vary from 30 pounds up to as high 100 pounds per square inch. With the aid of the reducing valve, this pressure will be reduced to a nearly uniform pressure of 15 pounds. Thus a substantially uniform flow of steam will take place through the leak port and through the pressure tube 88, which receives its entire supply from the leak port. The gage 115 provides a convenient means for the operator of the plant to assure himself of the proper functioning of the reducing valve.

As shown in Fig. 8, the reducing valve comprises a two-part body 117 between the parts of which the pressure diaphragm 118 is clamped along its edges. The pressure diaphragm 118 is pressed downwardly by a powerful coil spring 119 provided with a pressure-adjusting screw 120. The coil spring 119 is enclosed within a housing 121 screwed into the valve body 117. On the opposite side from the coil spring 119 the pressure diaphragm 118 carries a yoke 122 which extends downwardly nearly to the bottom of the valve body and carries a removable valve member 123 which is moved toward and from the seat 124 when the diaphragm 118 (and hence yoke 122) moves upwardly and downwardly responsive to changes in the steam pressure. Obviously, the coil spring 119 will counteract a certain steam pressure within the valve body 117; and as the coil spring 119 is tightened by the adjusting screw 120 it will counteract a higher steam pressure. The valve seat 124 surrounds an orifice 125 through which the live steam passes. A guide 126 is provided to guide the yoke 122 in its movements and a removable plug 127 holds the guide 126. Thus lateral movement of the yoke 122 is obviated, and valve 123 seats truly.

Figure 9:
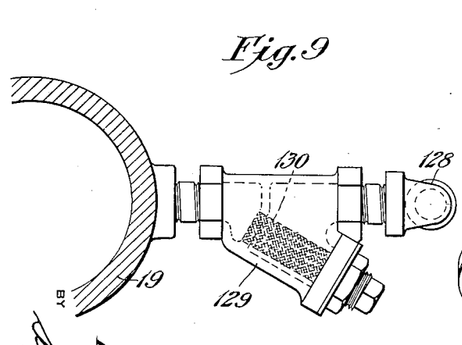
Fig. 9 is a vertical section on the scale of Fig. 8 showing the high pressure main and a strainer connected thereto.

Referring to Figs. 8 and 9, the steam is supplied to the reducing valve 117 by a pipe 128, the steam passing through a strainer 129 having a removable screen 130. The strainer is of standard construction and is used to prevent trash or other objectionable matter from passing through the system and interfering with the reducing valve or clogging the leak port 106.

Referring to Fig. 6, the pressure tube 88 is connected by a pipe 132 with a housing 133 within which is the operating diaphragm 134 of the regulating valve 18. The regulating valve 18 is of the balanced type and has a valve member 135 pressed by a valve spring 136 toward closed position. The upper valve seat 137 is of slightly larger diameter than the lower valve seat 138 so that there is a normal tendency for the steam pressure to move the valve 135 to open position, a tendency which is overcome by spring 136. An elongated stem 139 is directly connected at its lower end to the operating diaphragm 134, and is secured to valve 135 at its upper end. The stem 139 is received in a passageway 140 in a valve neck 141. There is a pipe 142 connecting the low pressure main 17 with the space above the diaphragm 134, preferably through an orifice 143 in the valve neck 141. The stem 139 is guided at one or more points by a guide 144.

From the foregoing description, it will be clear that when the pilot valve 84 is open (Fig. 7), no pressure can exist in pressure tube 88 greater than the pressure in low pressure main 17; but if valve 84 is closed with even the lightest pressure, a corresponding pressure will accumulate in pressure tube 88 and also underneath the operating diaphragm 134 (Fig. 6) of the regulating valve 18, because pipe 132 connects housing 133 with the pressure tube 88. Such accumulated pressure will open the balanced valve 135 against the pressure of spring 136.

Referring again to the pilot valve, as has already been brought out, any steam pressure within the valve chamber 82 (Fig. 7) will be communicated to the interior of bellows 94 and will tend to open valve 84, while a fluid pressure acting through tube 62 into casing 93 will exert an upward pressure on bellows 94, tending to close valve 84.

Since the area of the port leading to pressure tube 88 and closed by the pilot valve is very small, say 1/20th of 1 sq. in., and since the area of the bellows head 96 may be 2 sq. in., an upward pressure of 1 oz. per sq.

in. through tube 62 will create a total pressure of 2 oz. on bellows head 96, which pressure is communicated to valve 84 to hold it against or obstruct the flow of steam through pressure tube 88 with such force as to create a pressure of 40 oz. per sq. in. in tube 88, or 2 lbs. 8 oz., a pressure ample to move diaphragm 134 (Fig. 6) to open valve 135. This opening will permit steam to pass into low pressure main 17 and through pipe 89 (Fig. 7) into pilot valve 82 and hence into bellows 94. When the pressure in bellows 94 increases 1 oz. per sq. in., the effect of the fluid pressure in casing 93 will be overcome and pilot valve 84 will open, which in turn would lower the pressure in pressure tube 88 and cause the closing of the regulating valve 18.

From this it will be clear that any pressure applied through tube 62 to the interior of casing 93 will result in opening the regulating valve 18 and said valve will remain open until the pressure in the low pressure main 17 equals or only slightly exceeds the pressure in casing 93. The action will be automatic, continuous and highly sensitive, changes in pressure of less than 1 oz. per sq. in. in casing 93 being entirely effective to open or close the regulating valve adjacent the high pressure main.

The pipe 142 (Fig. 7) connects the low pressure main 17 with the space above diaphragm 134, and when the pilot valve is open, the low pressure main 17 is also connected through pressure tube 88 and pipe 132 with the space below diaphragm 134, so that the pressures on opposite sides of said diaphragm are balanced, irrespective of the degree of such pressures. The continuous small flow of steam through tube 88 in no way affects this balancing of pressures on opposite sides of diaphragm 134. As soon, however, as the pilot valve is closed to interrupt the flow of steam through pressure tube 88, an excess pressure will be built up in tube 88 and will operate against the lower side of diaphragm 134 to open the regulating valve.

While the parts shown in Fig. 6 are best used in conjunction with the described regulating apparatus, they could be used separately to regulate a steam heating system, if the temperature-responsive system be replaced by a manually controlled system, whether connected by fluid pressure or by mechanical means with the pilot valve.

Referring to Fig. 1, there is a pipe 150 preferably connected with supply riser 14, leading to and metallically connected with the underside of the tank 21 and also having a drip connection 151 with the drop riser 16. The steam in pipe 150 does not enter the tank 21 but by means of the pipe 150 heats the container so that a small amount of heat is conveyed to the oil in the container by conduction, the result being that, as long as steam is in pipe 150, there will be continually a temperature difference between the contents of the container and the outside air, and this temperature difference will continually dissipate the heat conveyed to the container. This temperature difference will not be uniform throughout the outside temperature range since the heat transmitted to the tank 21 by conduction through the metal will be greater at the lower outside temperatures when the temperature differences between the steam and the oil are greatest. But the expansion curve of the oil in container 21 when heat is applied will be uniform for any uniform series of outside weather conditions; and by changing the shape and proportions of the mercury column 81, it will be possible to maintain the pressure schedule required to provide the right amount of heat to meet these conditions. If heat should be cut off of a building for a period of time, as for instance, at night, the oil will cool off down to atmospheric temperature with a consequent abnormal shrinkage. When the heat is turned on in the morning, the steam pressure will be increased very materially for a period of time until the container 21 is warmed up to its normal state for that particular outside temperature. Thus the system will insure a certain excess pressure of steam when the steam is first turned on in the morning or at other times after the building has been allowed to cool down and will then change to the normal pressure which has been calculated to maintain the desired temperature.

Another advantage realized by the provision of heat to the container 21 arises from the fact that the temperature of the tank 21 will be reduced when the wind is blowing and the steam pressure will then be boosted to increase the heat delivered to the building (or to a certain zone of the building) to compensate for this greater demand. Thus the heating system is well adapted for a zoning system in which one regulating means will govern that portion of the heating system which serves the north and west sides of the building while another would serve the less exposed sides thereof.

Referring to the adjustable reversing relay of Fig. 2, it will be noted that bellows 55 is shorter than bellows 24. The reason for this lesser length is that the travel of bellows 55 is only about one-half the travel of bellows 24, on account of the levers and the connecting link, thus making it unnecessary to have bellows 55 the full length of bellows 24. On the other hand, bellows 24 contains possibly 15% of the total oil in the fluid-pressure system including said bellows, the tube 23 and the tank 21. If the reversing relay should be placed in a room with a wide variation in temperature, the expansion of oil in bellows 24 might introduce serious errors in the operation of the apparatus, which is supposed to depend entirely on expansion and contraction of the oil in tank 21, the connecting tube 23 being of extremely small size and containing a very small percentage of the oil. Such a possible error is almost completely neutralized by the fact that bellows 24 and 55 both expand or elongate at the same time and the ratio of expansion is in accordance with the ratio of bellows capacity.

The described apparatus provides a completely automatic regulating system which will properly change the steam pressure within a heating plant to keep step with changes in the outside temperature and to increase the steam pressure on windy days or on the windy side of a "zoned" building, as well as to decrease the steam delivered on bright, sunny days or on the sunny side of a "zoned" building. It provides for an automatic acceleration of the rate of pressure increase, as the outdoor temperature decreases and such acceleration is required to maintain a comfortable temperature; and on the other hand, decreases the pressure on a reverse descending scale as the weather becomes warmer. It also insures the delivery of a very large supply of steam to a building which has cooled off, as when the plant is first started up, early in the morning. The apparatus is simple of construction and hence trouble-proof and once installed properly should last without any attention except slight adjustments for the full life of the building in which it is installed.

Obviously the present invention is not restricted to the particular embodiment thereof herein shown and described. Moreover, it is not indispensable that all the features of the invention be used conjointly, since they may be employed advantageously in various combinations and sub-combinations.

What I claim is:—

1. Regulating apparatus for steam heating systems for buildings comprising, in combination, a pipe filled with a fluid; means utilizing the temperature of the air to provide a varying fluid pressure within said pipe; means actuated by variations in fluid pressure within said pipe to regulate the steam pressure within the heating system; and means to proportion the fluid pressure, and hence the steam pressure, so as to deliver uniform quantities of steam through an orifice for each degree difference in the air temperature.

2. Regulating apparatus for steam heating systems for buildings comprising, in combination, a temperature-responsive, fluid pressure system comprising a liquid-containing pipe, a piston actuated by the liquid in said pipe, a reservoir in communication with the pipe, and a column communicating with said reservoir, said column having a cross-section which diminishes in area toward its upper end, and the rate of decrease in said cross-section per unit of column height corresponding to the rate of increase in steam pressure required to deliver uniform quantities of steam through an orifice at uniformly increasing pressures; and means actuated by movement of said piston to regulate the steam pressure within the heating system.

3. Regulating apparatus for steam heating systems comprising, in combination, a movable head; a temperature-responsive fluid-pressure system for actuating the movable head; a pilot valve connected with said movable head; a high pressure main; a low pressure main; a regulating valve between said mains; means actuated by said pilot valve when closed and opened to open and close the regulating valve; and means connected with and forming a part of said temperature-responsive fluid-pressure system and constructed and arranged to accelerate the rate of pressure increase on the ascending scale so that the rate of increase of steam delivery will be in proper proportion to the lowering of the temperature.

4. Regulating apparatus for steam heating systems comprising, in combination, means for confining a fluid; means actuated by temperature changes to vary the pressure on said confined fluid; means for receiving a portion of said fluid, said receiving means being so constructed and arranged that it varies the pressure of said fluid according to a predetermined scale; and means actuated by variations in pressure of said fluid to increase or decrease the pressure in the supply pipes of the heating system.

5. Regulating apparatus for steam heating plants for buildings comprising, in combination, means for confining a fluid, said means being subjected to temperature changes; means moved upon expansion or contraction of said fluid; other means comprising a reservoir, a pipe and a column for confining a fluid which is led through said pipe to said movable means, so that the fluid in the second-named confining means is forced into and out of the reservoir responsive to contraction and expansion, respectively, of the fluid in the first named fluid confining means; and means exposed to the low pressure steam of the heating plant and also to the fluid in the second-named confining means and normally balanced between the steam and fluid pressure but moved by variations in the fluid pressure to regulate a pilot valve controlling the steam pressure within the heating system.

6. Regulating apparatus for steam heating systems for buildings comprising, in combination, means for confining a fluid, said means being subjected to temperature changes; means moved upon expansion or contraction of said fluid; other means comprising a reservoir, a pipe and a column for confining a fluid connected with said movable means so that the fluid in the second-named confining means is forced into and out of the reservoir and column responsive to contraction and expansion, respectively, of the fluid in the first confining means; said column having a cross-section which diminishes in area toward its upper end, and the rate of decrease in said cross-section per unit of column height corresponding to the rate of increase in steam pressure required to deliver uniform quantities of steam through an orifice at uniformly increasing pressures; and means actuated by variations of the fluid pressure in the second-named confining means to regulate the steam pressure within the heating system.

7. Regulating apparatus for steam heating systems for buildings comprising, in combination, means for confining a fluid, said means being subjected to temperature changes; means moved upon expansion or contraction of said fluid; other means comprising a reservoir, a pipe and a column for confining a fluid connected with said movable means so that the fluid in the second-named confining means is forced into and out of the reservoir and column responsive to contraction and expansion, respectively, of the fluid in the first confining means; said column having a cross-section which diminishes in area toward its upper end, and the rate of decrease in said cross-section per unit of column height corresponding to the rate of increase in steam pressure required to deliver uniform quantities of steam through an orifice at uniformly increasing pressures; and means actuated by variations of the fluid pressure in the second-named confining means to regulate the steam pressure within the heating system; said regulating means comprising a pilot valve, a regulating valve connected with said pilot valve by a tube, and means movable by changes in pressure in the fluid in the second-named fluid-confining means to open and close the pilot valve, thereby to effect closing and opening, respectively, of the regulating valve.

8. In combination, a pipe containing liquid; a tank connected with said pipe and also containing the liquid; a high pressure main; a low pressure main; and means for governing the flow of steam through the low pressure main comprising a regulating valve between the two mains and a pilot valve so connected as to govern the regulating valve; means so constructed and arranged that it is actuated by contraction and expansion of the liquid in said tank to open and close the pilot valve; said steam-flow-governing means also comprising means for accelerating the pressure of steam to deliver substantially uniform quantities for each unit of decrease in the volume of said liquid due to contraction, and decelerating the pressure of steam upon expansion of said liquid due to heat.

9. In combination, a tank containing a supply of liquid; a pipe connected with said tank and also containing said liquid; and means for governing the flow of steam through a steam heating plant; said means being so constructed and arranged that it is actuated by contraction and expansion of the liquid in said tank; said means comprising a pilot valve; a piston opening and closing the pilot valve; a steam regulating valve which is opened upon closing of said pilot valve; a head movable by said liquid to close said pilot valve upon contraction of the liquid in the tank; and a confined mass of liquid between the aforesaid piston and the movable head.

10. In combination, a tank containing a supply of liquid; a pipe connected with said tank and also containing said liquid; and means governing the flow of steam through a steam heating plant actuated by contraction and expansion of the liquid in said tank; said means comprising a pilot valve; a piston opening and closing the pilot valve; a steam regulating valve which is opened upon closing of said pilot valve; a head movable by said liquid to close said pilot valve upon contraction of the liquid in the tank; a confined mass of liquid between the aforesaid piston and the movable head; and means serving as a reservoir for part of said confined liquid; said reservoir being so made that a relatively large quantity of liquid is first taken in without a proportionately large rise in the liquid level, and later a small quantity of liquid will cause a considerable rise in the liquid level.

11. In combination, a support; a cylinder; a movable head or piston in the cylinder; a column of liquid normally acting on said head; a spring also acting on said head in opposition to the column of liquid; a lever connected with said head so as to be moved synchronously therewith; a second lever connected with the first; a spring acting on the second lever to cause it to move in the direction of the first lever; a second cylinder having a movable head or piston in it; a column of liquid acting on the second-named movable head; the second lever being held by its spring against said second-named head; the parts being so arranged that expansion of the first column of liquid moves both heads and hence lowers the second column of liquid.

12. In combination, a support; a cylinder; a movable head or piston in the cylinder; a column of liquid normally acting on said head; a spring also acting on said head in opposition to the column of liquid; a lever connected with said head so as to be moved synchronously therewith; a second lever connected with the first; a spring acting on the second lever to cause it to move in the direction of the first lever; a second cylinder having a movable head or piston in it; a column of liquid acting on the second-named movable head; the second lever being held by its spring against said second-named head; the parts being so arranged that expansion of the first column of liquid moves both heads and hence lowers the second column of liquid; and an adjustable stop screw for the second lever to prevent swinging thereof past a certain point responsive to pressure from the second spring.

13. In combination, a support; a cylinder; a movable head or piston in the cylinder; a column of liquid normally acting on said head; a spring also acting on said head in opposition to the column of liquid; a lever connected with said head so as to be moved synchronously therewith; a second lever connected with the first; said lever connection being so constructed and arranged that movement of the first lever responsive to expansion of the first column of liquid may take place independently of the second lever, but movement of the first lever responsive to contraction of the first column of liquid must effect simultaneous movement of the second lever and hence of the second head; a spring acting on the second lever to cause it to move in the direction of the first lever; a second cylinder having a movable head or piston in it; a column of liquid acting on the second-named movable head; the second lever being held by its spring against said second-named head; the parts being so arranged that expansion of the first column of liquid moves both heads and hence lowers the second column of liquid.

14. In combination, a support; a cylinder; a movable head or piston in the cylinder; a column of liquid normally acting on said head; a spring also acting on said head in opposition to the column of liquid; a second cylinder having a movable head or piston in it; means connecting the two heads together; a column of liquid acting on the second-named movable head; the parts being so arranged that expansion of the first column of liquid moves both heads and hence lowers the second column of liquid.

15. In combination, a support; a cylinder; a movable head or piston in the cylinder; a column of liquid normally acting on said head; a spring also acting on said head in opposition to the column of liquid; a second cylinder having a movable head or piston in it; means connecting the two heads together; a column of liquid acting on the second-named movable head; the parts being so arranged that expansion of the first column of liquid moves both heads and hence lowers the second column of liquid; another head or piston moved by the second column of liquid; a pilot valve opened and closed by movement of the head last named; and a regulating valve opened by closing of said pilot valve.

16. A device for accelerating the flow of steam in an automatically controlled steam heating system comprising, in combination, a mercury reservoir having a pipe connection; and an upright column communicating with said reservoir at the bottom but otherwise closed on all sides; said column having a cross-section which diminishes in area toward its upper end, so that a large increase in volume of the fluid in said pipe connection is necessary to effect a small rise of the mercury in the column at the lower end of the column, whereas a small increase in volume of the fluid in said pipe connection may effect a relatively large rise of the mercury in the column at the upper end thereof.

17. A device for accelerating the flow of steam in an automatically controlled steam heating system comprising, in combination, a reservoir having a pipe connection; and an upright hollow column communicating with said reservoir at the bottom and closed on all sides; said column having a cross-section which diminishes in area toward its upper end; the rate of decrease in said cross-sectional area per unit of height corresponding to the rate of increase in steam pressure required to deliver uniform quantities of steam through an orifice at uniformly increasing pressures.

18. In combination, a high pressure steam main; a reducing valve connected thereto; and means connected to the low pressure side of said reducing valve to restrict flow of steam through a pipe; said means comprising a body; a bushing within the body having a small orifice; and manually operable means to effect cleaning of said orifice.

19. A regulating system for steam heating plants comprising, in combination, a regulating valve; a pilot valve; a pipe connecting the pilot valve with a source of steam supply; another pipe connecting the pilot valve with a point of discharge for the steam; a head movable to close said pilot valve; thermostatic means to move said head so that the pilot valve is closed upon a fall of temperature; and means interposed between the pilot valve and the regulating valve to open the same when the pilot valve is closed.

20. A regulating system for steam heating plants comprising, in combination, a regulating valve; a pilot valve; a pipe connecting the pilot valve with a source of steam supply; another pipe connecting the pilot valve with a point of discharge for the steam; a head movable to close said pilot valve; thermostatic means to move said head so that the pilot valve is closed upon a fall of temperature; and steam-pressure-actuated means connected with said pipe to operate the regulating valve upon opening and closing of said pilot valve.

21. A regulating system for steam heating plants comprising, in combination, a tank; a pipe connected with the interior of said tank; a regulating valve governing the flow of steam through the plant; a pilot valve governing the regulating valve; means interposed between the pilot valve and the pipe and operated by expansion and contraction of fluid in said pipe and tank to operate the pilot valve; and means connected with the heating plant to supply a relatively small amount of heat to the tank.

22. A regulating system for steam heating plants comprising, in combination, a tank; a pipe connected with the interior of said tank; a regulating valve governing the flow of steam through the plant; means operated by expansion and contraction of fluid in said pipe and tank to operate the regulating valve; and means to supply a relatively small amount of heat to the tank, said heat-supplying means being cut off automatically when said heating plant cools off.

23. Regulating apparatus for steam heating system for buildings comprising, in combination, a tank located outside the building; a pipe connected with the tank; a piston movable in a cylinder responsive to expansion and contraction of fluid contained in said pipe and tank; a high pressure main; a low pressure main; a regulating valve between said mains; and means actuated by movement of said piston to govern the regulating valve; said means opening said regulating valve and increasing the pressure in the system when the fluid contracts in said tank and pipe due to a lowered temperature.

24. Regulating apparatus for steam heating systems for buildings comprising, in combination, a tank exposed to the air; a pipe connected with the tank; a high pressure main; a low pressure main; a piston movable in a chamber and acted on one side by steam from the low pressure main; means responsive to expansion and contraction of fluid contained in said pipe and tank and acting on the opposite side of said piston; a regulating valve between said mains; a pilot valve which is closed by movement of said piston responsive to contraction of said fluid; a pressure tube so connected to the high pressure main that a continuous small flow of steam passes through it, and also connected with the interior of said pilot valve; means connecting the interior of the pilot valve with the side of said piston opposite to the one acted on by said fluid; and means securing the valve member of the pilot valve and the piston together, so that said valve is closed whenever the fluid pressure increases; the pilot valve governing the regulating valve.

25. Regulating apparatus for steam heating systems for buildings comprising, in combination, a tank exposed to the air; a pipe connected with the tank; a high pressure main; a low pressure main; a piston acted upon by steam pressure from the low pressure main on one side; means movable responsive to expansion and contraction of fluid contained in said pipe and tank and acting against the other side of the piston; a regulating valve between said mains; a pilot valve which is closed by movement of said piston responsive to contraction of said fluid; a pressure tube so connected to the high pressure main that a continuous small flow of steam passes through it, and also connected with the interior of said pilot valve; means connecting the interior of the pilot valve with the side of said piston opposite to the one acted on by said fluid; a pipe connecting the interior of the pilot valve with the low pressure main; and means securing the valve member of the pilot valve and the piston together, so that said valve is closed whenever the fluid pressure increases; the pilot valve governing the regulating valve.

26. Regulating apparatus for steam heating systems for buildings comprising, in combination, a tank exposed to the air; a pipe connected with the tank; a high pressure main; a low pressure main; a piston acted upon by steam pressure from the low pressure main on one side; means movable responsive to expansion and contraction of fluid contained in said pipe and tank and acting against the other side of the piston; a regulating valve between said mains; a pilot valve which is closed by movement of said piston responsive to contraction of said fluid; a pressure tube so connected to the high pressure main that a continuous small flow of steam passes through it, and also connected with the interior of said pilot valve; means connecting the interior of the pilot valve with the side of said piston opposite to the one acted on by said fluid; a pipe connecting the interior of the pilot valve with the low pressure main; means securing the valve member of the pilot valve and the piston together, so that said valve is closed whenever the fluid pressure increases; a diaphragm for actuating said regulating valve; and means connecting the pressure tube with said diaphragm so that when an excess pressure is built up in the pressure tube the diaphragm will be moved to open said regulating valve.

27. Regulating apparatus for steam heating systems for buildings comprising, in combination, a tank exposed to the air; a pipe connected with the tank; a high pressure main; a low pressure main; a piston acted upon by steam pressure from the low pressure main on one side; means movable responsive to expansion and contraction of fluid contained in said pipe and tank and acting against the other side of the piston; a regulating valve between said mains; a pilot valve which is closed by movement of said piston responsive to contraction of said fluid; a pressure tube so connected to the high pressure main that a continuous small flow of steam passes through it, and also connected with the interior of said pilot valve; means connecting the interior of the pilot valve with the side of said piston opposite to the one acted on by said fluid; a pipe connecting the interior of the pilot valve with the low pressure main; means securing the valve member of the pilot valve and the piston together, so that said valve is closed whenever the fluid pressure increases; a diaphragm for actuating said regulating valve; means connecting the pressure tube with said diaphragm so that when an excess pressure is built up in the pressure tube the diaphragm will be moved to open said regulating valve; and a pipe connecting the low pressure main with the other side of said diaphragm so that the pressures on opposite sides of said diaphragm are equal except when a pressure is built up in the pressure tube by closing of the pilot valve.

28. Regulating apparatus for steam heating systems for buildings comprising, in combination, temperature-responsive, fluid-pressure means comprising a column of liquid, a piston movable responsive to expansion and contraction of said liquid, a second piston connected with and movable responsive to the first piston but in an opposite direction; a column of liquid raised and lowered by movements of said second piston; a third piston acted on by said second-named column of liquid; a pilot valve; connections between said third piston and the pilot valve so that when the third piston moves responsive to a fall in the temperature, the pilot valve closes; a high pressure main; a low pressure main; a regulating valve between said mains; a pressure tube so connected to the high pressure main that a continuous small flow of steam passes through it, and also connected with the interior of said pilot valve; means connecting the interior of said third pilot valve with the side of said piston opposite to the one acted on by said fluid; a pipe connecting the interior of the pilot valve with the low pressure main; a diaphragm for actuating said regulating valve; means connecting the pressure tube with said diaphragm so that when an excess pressure is built up in the pressure tube the diaphragm will be moved to open said regulating valve; and a pipe connecting the low pressure main with the other side of said diaphragm so that the pressures on opposite sides of said diaphragm are equal except when a pressure is built up in the pressure tube by closing of the pilot valve.

29. Regulating apparatus for steam heating systems for buildings comprising, in combination, a tank located outside the building; a pipe connected with the tank; a piston movable in a cylinder responsive to expansion and contraction of fluid contained in said pipe and tank; a high pressure main; a low pressure main; a regulating valve between said mains; a pilot valve which is closed by movement of said piston responsive to contraction of said fluid; a pressure tube connected with the interior of said pilot valve; means connecting the interior of the pilot valve with the side of said piston opposite to the one acted on by said fluid; means securing the valve member of the pilot valve and the piston together, so that said valve is closed whenever the fluid pressure increases; a reducing valve between the high pressure main and the pressure tube; a leak port restricting flow of steam from the low pressure side of the reducing valve to the pressure tube; and means connecting the pilot valve with the regulating valve so that when said pilot valve is closed, the regulating valve will be opened.

30. Regulating apparatus for steam heating systems for buildings comprising, in combination, temperature-responsive, fluid-pressure means comprising a column of liquid, a piston movable responsive to expansion and contraction of said liquid, a second piston connected with and movable responsive to the first piston but in an opposite direction; a column of liquid raised and lowered by movements of said second piston, a third piston acted on by said second-named column of liquid; a pilot valve; connections between said third piston and the pilot valve so that when the third piston moves responsive to a fall in the temperature, the pilot valve closes; a high pressure main; a low pressure main; a regulating valve between said mains; a pressure tube connected with the interior of said pilot valve; means connecting the interior of the pilot valve with the side of said piston opposite to the one acted on by said fluid; a reducing valve between the high pressure main and the pressure tube; a leak port restricting flow of steam from the low pressure side of the reducing valve to the pressure tube; and means connecting the pilot valve with the regulating valve so that when said pilot valve is closed, the regulating valve will be opened.

31. Regulating apparatus for steam heating systems for buildings comprising, in combination, a tank located outside the building; a pipe connected with the tank; a piston movable in a cylinder responsive to expansion and contraction of fluid contained in said pipe and tank; a high pressure main; a low pressure main; a regulating valve between said mains; a pilot valve which is closed by movement of said piston responsive to contraction of said fluid; a pressure tube; a reducing valve between the high pressure main and the pressure tube; a leak port between the reducing valve and the pressure tube to restrict the flow of steam through said tube; said pressure tube being open to the pilot valve on one side so that flow of steam is stopped when the pilot valve is closed; means connecting the interior of the pilot valve with the side of said piston opposite to the one acted on by said fluid; a pipe connecting the interior of the pilot valve with the low pressure main; means securing the valve member of the pilot valve and the piston together, so that said valve is closed whenever the fluid pressure increases; a diaphragm for actuating said regulating valve; means connecting the pressure tube with said diaphragm so that when an excess pressure is built up in the pressure tube the diaphragm will be moved to open said regulating valve; and a pipe connecting the low pressure main with the other side of said diaphragm so that the pressures on opposite sides of said diaphragm are equal except when a pressure is built up in the pressure tube by closing of the pilot valve.

32. Regulating apparatus for steam heating systems characterized by the provision of a fluid pressure system comprising a mercury column of varying cross-section and a mass of confined liquid whose pressure causes the mercury in said column to rise and fall at a rate determined by the cross-sectional dimensions of said column at different points along its length; and means actuated by the varying pressure of said confined liquid to regulate the flow of steam through the steam heating system.

In testimony that I claim the foregoing as my own, I have hereto affixed my signature.

EDGAR C. WILEY.